US008073249B2

(12) United States Patent
Tang et al.

(10) Patent No.: US 8,073,249 B2
(45) Date of Patent: Dec. 6, 2011

(54) IMAGE ADJUSTMENT APPARATUS AND METHOD THEREOF

(75) Inventors: Sen-Huang Tang, Luodong Township, Yilan County (TW); Wen-Tsai Liao, Rueifang Township, Taipei County (TW)

(73) Assignee: Realtek Semiconductor Corp., Hsinchu (TW)

( * ) Notice: Subject to any disclaimer, the term of this patent is extended or adjusted under 35 U.S.C. 154(b) by 1091 days.

(21) Appl. No.: 11/907,139

(22) Filed: Oct. 10, 2007

(65) Prior Publication Data

US 2009/0080793 A1 Mar. 26, 2009

(30) Foreign Application Priority Data

Oct. 11, 2006 (TW) ................................ 95137416 A

(51) Int. Cl.
*G06K 9/00* (2006.01)
*G06K 9/40* (2006.01)
*H04N 5/57* (2006.01)

(52) U.S. Cl. ......................... 382/167; 382/254; 348/687

(58) Field of Classification Search ........................ None
See application file for complete search history.

(56) References Cited

U.S. PATENT DOCUMENTS 5,734,362 A * 3/1998 Eglit ................................ 345/89
5,754,150 A * 5/1998 Matsui ............................ 345/89
6,061,091 A * 5/2000 Van de Poel et al. ......... 348/241
6,097,836 A * 8/2000 Inoue ............................ 382/165
7,742,637 B2 * 6/2010 Xiao et al. ..................... 382/167
2002/0051090 A1 * 5/2002 Onagawa ...................... 348/687
2006/0165281 A1 * 7/2006 Fujino ........................... 382/167
2006/0268180 A1 * 11/2006 Chou ............................ 348/673
2007/0070214 A1 * 3/2007 Nakamura ................. 348/222.1
2007/0092139 A1 * 4/2007 Daly ............................. 382/169
2008/0100554 A1 * 5/2008 Mori ............................... 345/89

FOREIGN PATENT DOCUMENTS

EP 0921691 6/1999
WO WO2007/073388 6/2007

* cited by examiner

*Primary Examiner* — Samir Ahmed
*Assistant Examiner* — Li Liu
(74) *Attorney, Agent, or Firm* — Thomas, Kayden, Horstemeyer & Risley, LLP

(57) ABSTRACT

The present invention relates to an apparatus and a method thereof for adjusting a luminance of an image signal. The apparatus includes a complementary circuit, a statistical circuit, a calculating circuit, and a blending circuit. The complementary circuit receives an image signal to generate a complementary luminance according to the luminance of the image signal. The statistical circuit receives the image signal to generate a statistical signal according to the luminance of the image signal. The calculating circuit receives the image signal, the complementary luminance, and the statistical signal to generate a calculated luminance of the image signal. The blending circuit generates an output image signal according to the calculated luminance and the luminance of the image signal. A video display device can thereby displays optimum pictures according to the output image signal.

17 Claims, 6 Drawing Sheets

IMAGE ADJUSTMENT APPARATUS AND METHOD THEREOF

FIELD OF THE INVENTION

The present invention relates to an apparatus and a method thereof for image adjustment, and more particularly to an apparatus and a method thereof for adjusting a luminance of an image signal.

BACKGROUND OF THE INVENTION

Display devices are indispensable necessities for people in daily life. No matter the display devices installed on mobile phones or the display devices for displaying television programs, they are a part of people's daily lives. Due to their great popularity and importance, users regard the quality of display devices as an important issue gradually. The luminance of frames displayed by display devices is one of the key factors for enhancing display qualities. Thereby, luminance adjustment becomes an important issue in research and development for display manufacturers. In the past, adjustment of the luminance for display devices usually needs a complex process in order to get a better luminance. The conventional adjustment technique utilizes a plurality of linear oblique lines to form a line with many connecting points for representing the corresponding relation between an input luminance and an output luminance in rectangular coordinate. Next, the conventional adjustment technique adjusts luminance of image signal according to the line. Due to the process mentioned above, the boundary effect will be occurred. In addition, it needs more process at the connecting points of the plurality of linear oblique lines in the line. That is why the conventional adjustment technique is so complex that it has the slow process and serious distortion. Thereby, the picture quality presented by the display device is reduced.

SUMMARY

The purpose of the present invention is to provide an apparatus and a method thereof for adjusting a luminance of an image signal to rapidly adjust image luminance of a display device in order to reduce the adjustment time.

Another purpose of the present invention is to provide an apparatus and a method thereof for adjusting a luminance of an image signal to prevent from luminance distortion while displaying images by a display device.

Another purpose of the present invention is to provide an apparatus and a method thereof for adjusting a luminance of an image signal to enhance the picture quality of a display device.

The present invention discloses the apparatus and the method thereof for adjusting a luminance of an image signal, wherein the apparatus includes a complementary circuit, a statistical circuit, a calculating circuit and a blending circuit. The method includes receiving an image signal by the complementary circuit to generate a complementary luminance, generating a statistical signal by the statistical circuit according to the luminance of the image signal, generating a calculated luminance of the image signal by a predetermined function of the calculating circuit according to the luminance of the image signal, the complementary luminance and the statistical signal, and generating an output image signal by the blending circuit according to the luminance of the image signal and the calculated luminance of the image signal.

In order to make the structure and characteristics as well as the effectiveness of the present invention to be further understood and recognized, the detailed description of the present invention is provided as follows along with preferred embodiments and accompanying figures.

DETAILED DESCRIPTION

Figure 1:
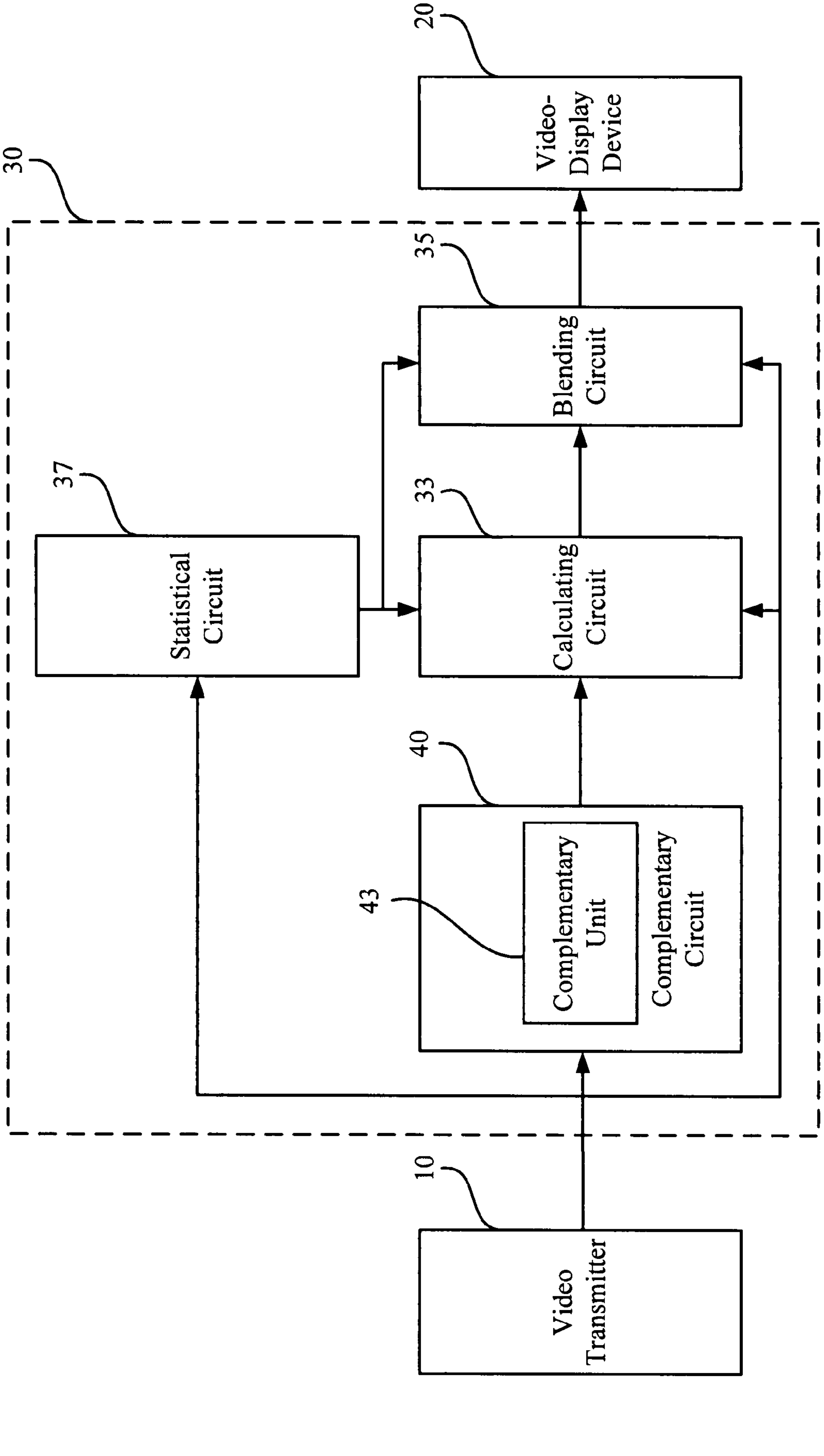
FIG. 1 shows a block diagram according to a preferred embodiment of the present invention.

FIG. 1 shows a block diagram according to a preferred embodiment of the present invention. As shown in the figure, an image adjustment apparatus 30 according to the present invention includes a calculating circuit 33, a blending circuit 35, a statistical circuit 37, and a complementary circuit 40. The image adjustment apparatus 30 receives an image signal, which is a luminance input signal of images, transmitted by a video transmitter 10. Then, the image adjustment apparatus 30 generates an output image signal, which is a luminance output signal, after a process for adjustment. The luminance output signal is transmitted to a video display device 20 for displaying images according to the luminance output signal. Accordingly, picture qualities are enhanced.

The luminance input signal and the luminance output signal both represent luminance values of displayed images. Under normal conditions, the range of the luminance value is from 0 to 255. The luminance value is responsive to the luminance, that is to say, the smaller the luminance value is, the darker the luminance is, and the larger the luminance value is, the brighter the luminance is. A complementary unit 43 in the complementary circuit 40 performs complementary processes according to the luminance of the luminance input signal and generates a complementary luminance that is complementary to the luminance of the luminance input signal. The sum of the luminance values of the luminance input signal and the complementary luminance is 255.

The calculating circuit 33 couples to the complementary circuit 40 for receiving the luminance input signal and the complementary luminance. The calculating circuit 33 performs a predetermined function of the luminance input signal and the complementary luminance to generate a calculated luminance of the image signal, and then transmits the calculated luminance of the image signal to the blending circuit 35. Afterwards, the blending circuit 35 blends the calculated luminance of the luminance input signal and the luminance of the luminance input signal to generate the luminance output signal according to a blending factor and transmits the luminance output signal to the video display device 20 for playing images. Then, the statistical circuit 37 receives the luminance input signal to generate a corresponding statistical signal according to the luminance of the luminance input signal and to transmit the statistical signal to the calculating circuit 33. According to the statistical signal, the calculating circuit 33 can generate the calculated luminance of the image signal. The statistical circuit 37 also transmits the statistical signal to the blending circuit 35. Thereby, the blending circuit 35 can generate the luminance output signal according to the statistical signal.

Figure 2:
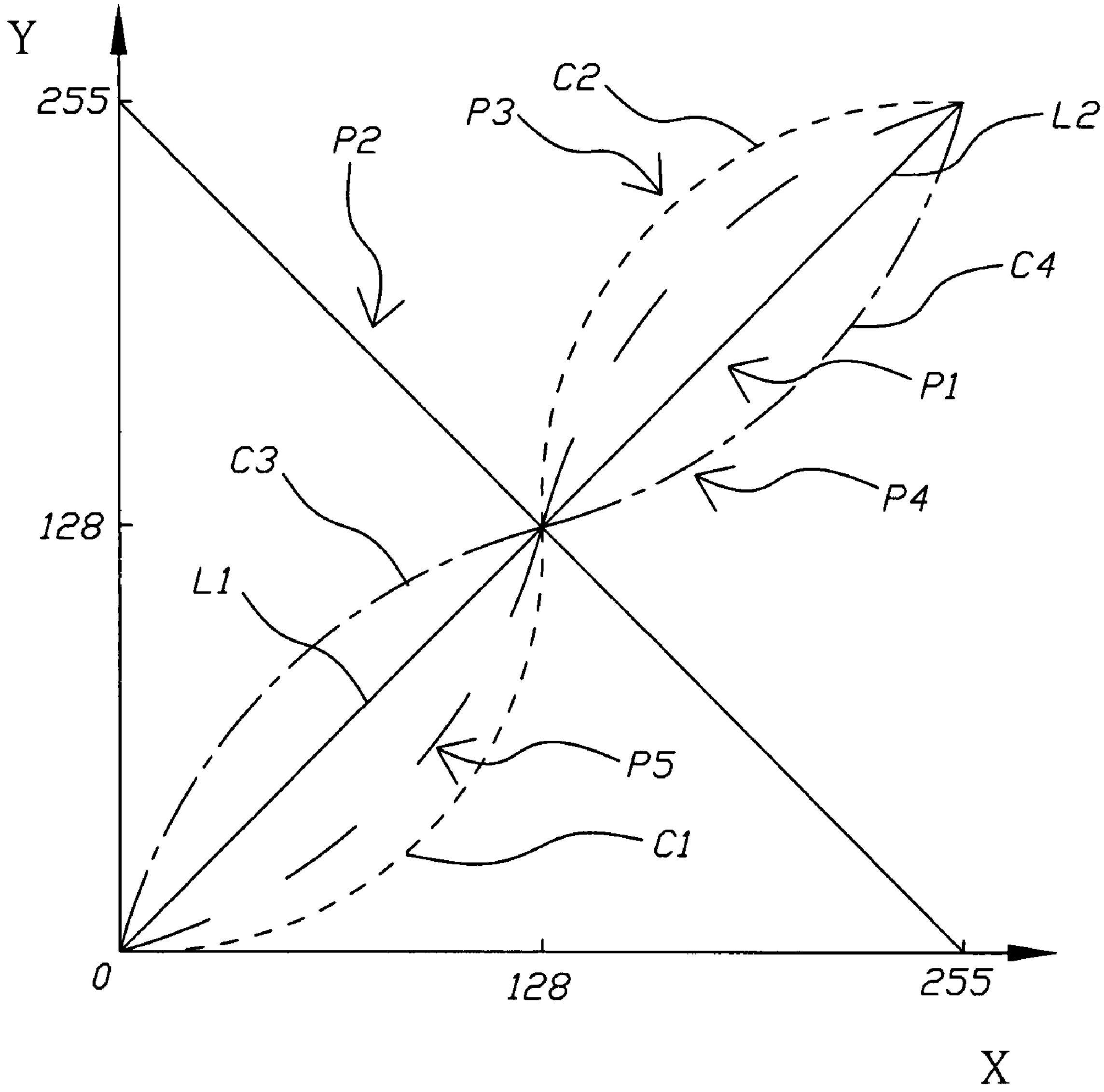
FIG. 2 shows curves according to a preferred embodiment of the present invention.

In order to describe the processing according to the present invention, please refer to FIG. 2, which shows curves according to a preferred embodiment of the present invention. As shown in the figure, the x-axis represents input luminance value, while the y-axis represents the output luminance value. The oblique line P1 represents that the input luminance values are equal to the output luminance values when there is no image adjustment apparatus 30 for adjusting image. When the luminance input signal is transmitted to the complementary unit 43, the oblique line P2 is generated presented in FIG. 2. The oblique line P2 is complementary to the oblique line P1, and the coordinate of the intersection of the oblique lines P1 and P2 is approximately (128, 128).

Then, according to the luminance of the luminance input signal, the statistical signal, and the complementary luminance, the calculating circuit 33 generates a curve, that is, the calculated luminance of the image signal. If images are displayed according to the curve P3, images with input luminance values less than 128 will be displayed with luminance values less than the input luminance values, and images with input luminance values greater than 128 will be displayed with luminance values greater than the input luminance values. On the other hand, if images are displayed according to the curve P4, images with input luminance values less than 128 will be displayed with luminance values greater than the input luminance values, and images with input luminance values greater than 128 will be displayed with luminance values less than the input luminance values.

The blending circuit 35 mixes the luminance of the luminance input signal and the calculated luminance of the luminance input signal according to the blending factor to generate the luminance output signal. If the calculating circuit 33 generates the curve P3, then the luminance output signal can have four categories. Here, we use the intersection of the oblique lines P2 and P1 as a dividing point. In addition, we define the segments of the oblique line P1 with luminance value less than 128, the oblique line P1 with luminance value greater than 128, the curve P3 with luminance value less than 128, and the curve P3 with luminance value greater than 128 as L1, L2, C1, and C2 respectively. The four categories are the combinations of L1 and L2, L1 and C2, C1 and L2, and C1 and C2. If the calculating circuit 33 generates the curves P3 and P4, then the luminance output signal can have nine categories. In the same way, we define the segments of the oblique line P1 with luminance value less than 128 and the oblique line P1 with luminance value greater than 128 as L1 and L2 respectively. In addition, we also define the curve P3 with luminance value less than 128, the curve P3 with luminance value greater than 128, the curve P4 with luminance value less than 128, and the curve P4 with luminance value greater than 128 as C1, C2, C3, and C4 respectively. Moreover, the nine categories are the combinations of L1 and L2, L1 and C2, L1 and C4, C1 and L2, C1 and C2, C1 and C4, C3 and C2, C3 and L2, and C3 and C4. The statistical signal that the statistical circuit 37 transmits to the blending circuit 35 is used for adjusting curvature of the curves to vary the relationship between input and output luminance. For example, the calculating circuit 33 generates the curve P5 by shrinking the curve P3 according to the statistical signal. That is to say, the variation amplitude of input and output luminance of the curve P5 is smaller than that of the curve P3.

Figure 3:
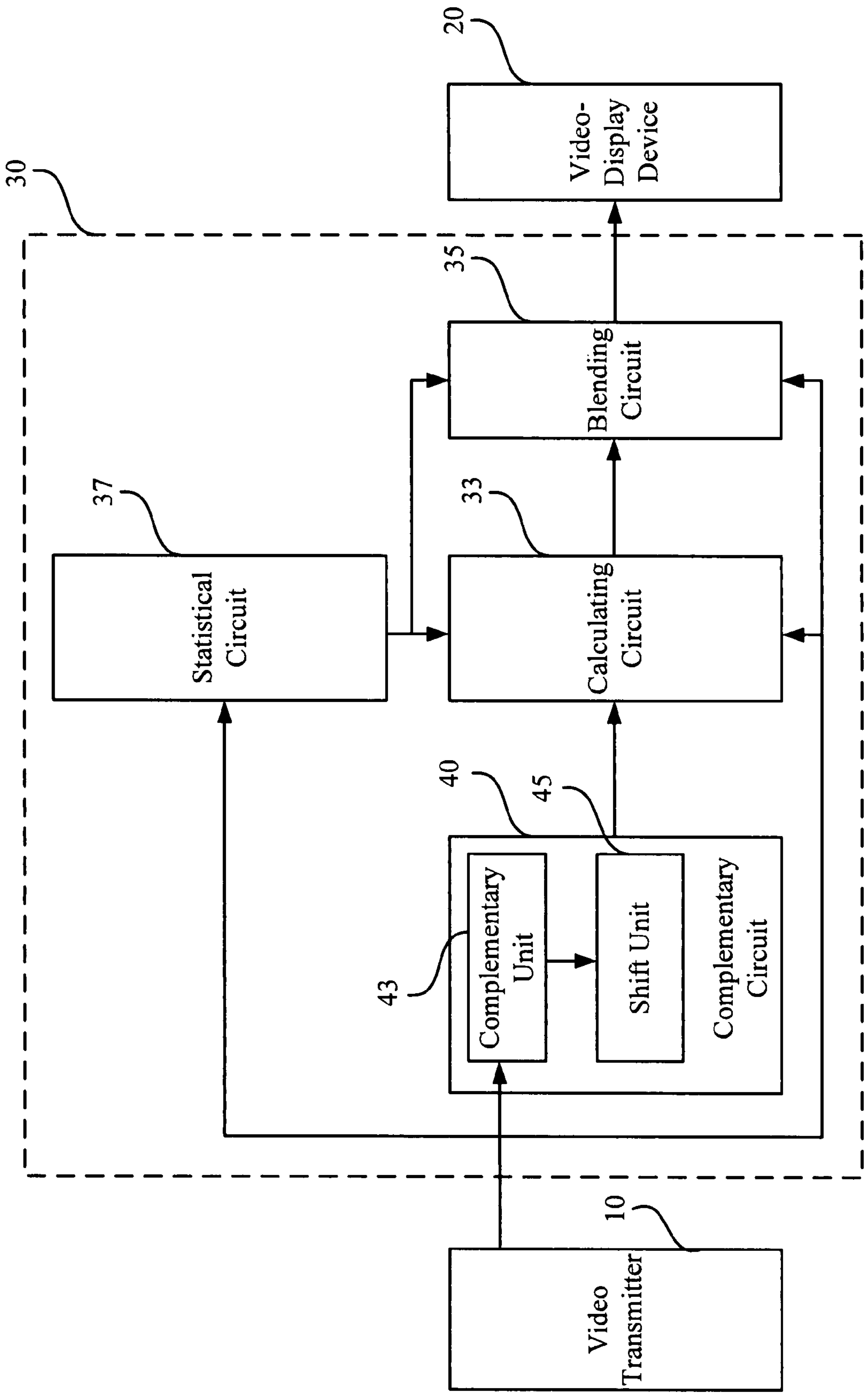
FIG. 3 shows a block diagram according to another preferred embodiment of the present invention.
Figure 4:
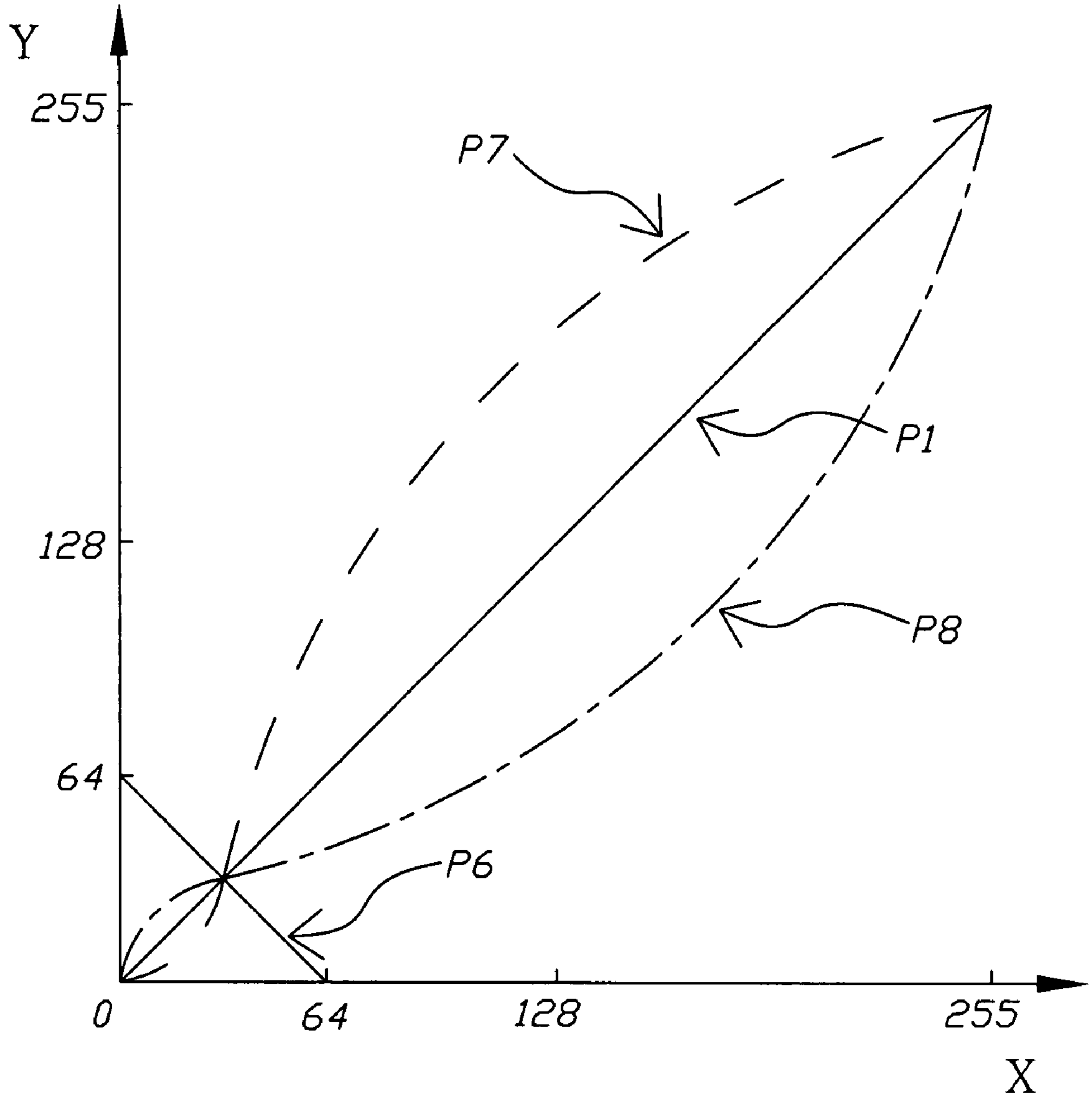
FIG. 4 shows curves according to another preferred embodiment of the present invention.

The image adjustment apparatus 30 further includes a shift unit 45. FIG. 3 shows a block diagram according to another preferred embodiment of the present invention. As shown in the figure, the complementary circuit 40 includes the shift unit 45, which shifts the complementary luminance according to a shift value to vary the intersection of the complementary luminance and the luminance input signal. FIG. 4 shows curves according to another preferred embodiment of the present invention. As shown in the figure, the intersection of the oblique lines P1 and P6 is approximately (32, 32), that is to say, the shift unit 45 shifts the oblique line P2 in FIG. 2 to form the oblique line P6. According to the oblique lines P1 and P6, the calculating circuit 33 generates the curve P7 or the curve P8.

Figure 5:
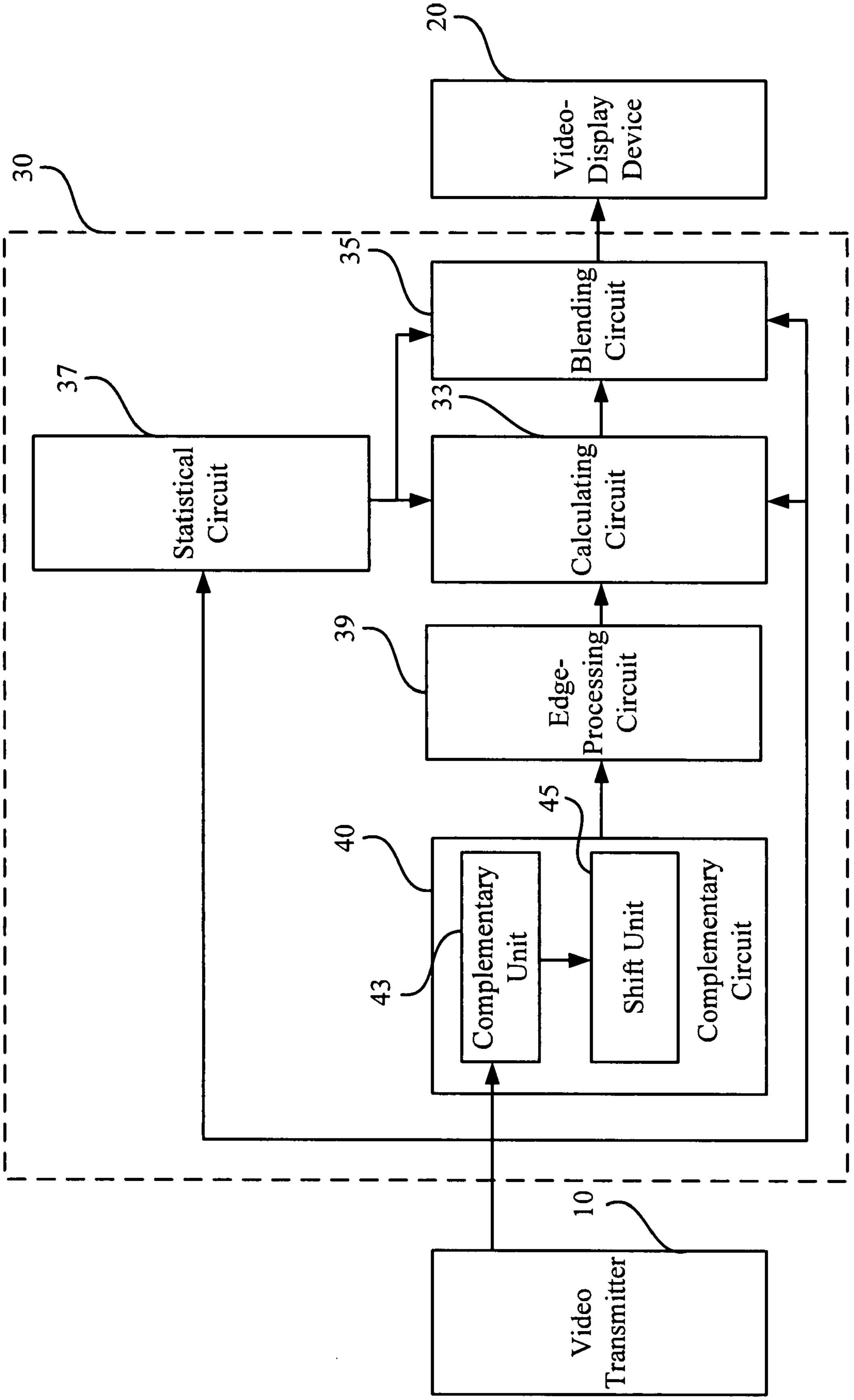
FIG. 5 shows a block diagram according to another preferred embodiment of the present invention.

Continuing the proceeding description, because the luminance output signal discontinues at intersections, for example, at x=128 in FIG. 2, the image adjustment apparatus 30 can further include an edge-processing circuit 39. FIG. 5 shows a block diagram according to another preferred embodiment of the present invention. As shown in the figure, the edge-processing circuit 39 is coupled between the complementary circuit 40 and the calculating circuit 33 for solving the problem described above by an edge process to the complementary luminance in advance. The edge-processing circuit 39 smoothes the complementary luminance. In addition, the edge-processing circuit 39 can be implemented by a low-pass filter. Thus, the edge-processing circuit 39 smoothes the complementary luminance by using low-pass filtering.

Figure 6:
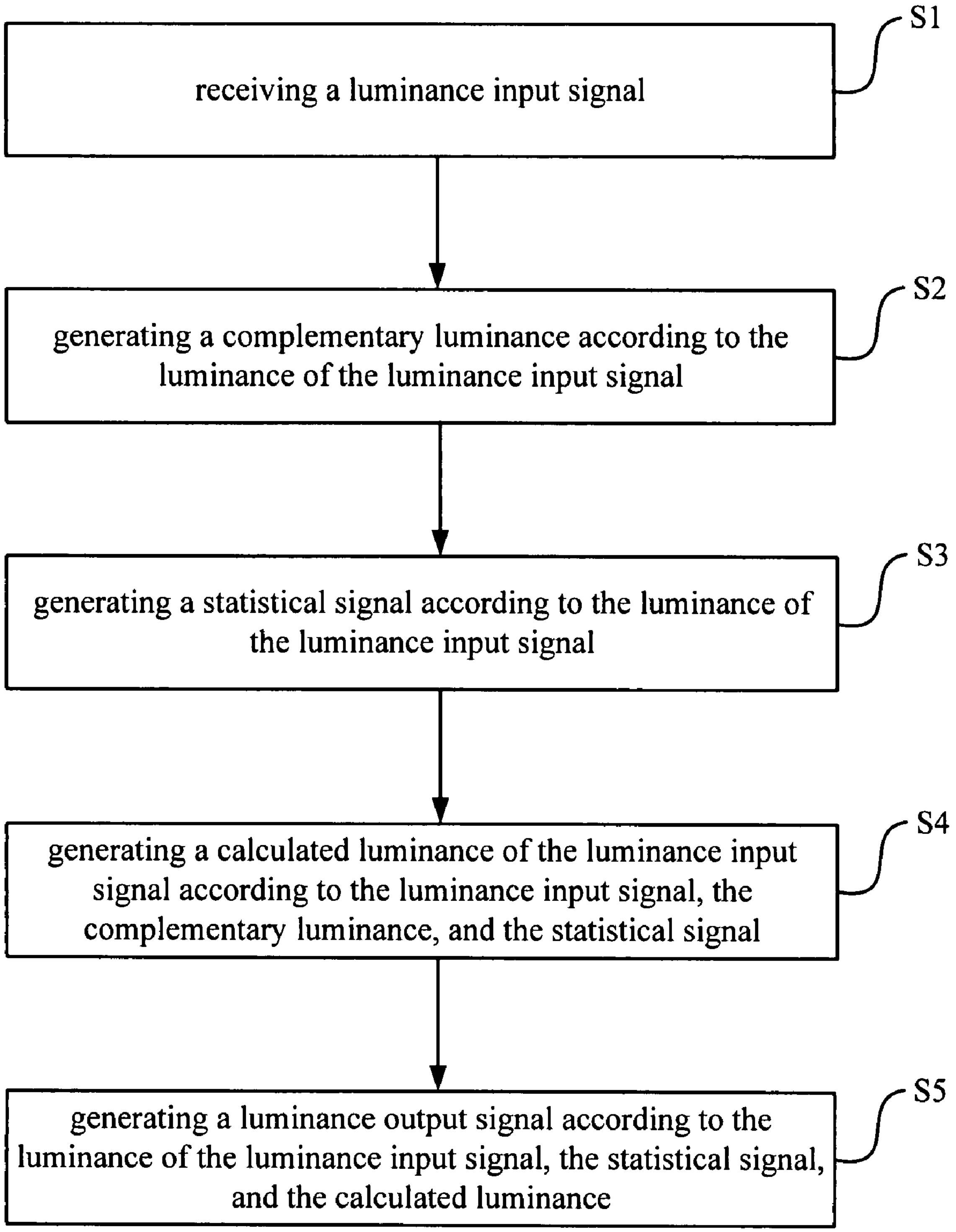
FIG. 6 shows a flowchart according to a preferred embodiment of the present invention.

FIG. 6 shows a flowchart according to a preferred embodiment of the present invention. As shown in the figure, the complementary circuit 40 receives a luminance input signal in the step S1. Next, in the step S2, the complementary unit 43 in the complementary circuit 40 generates a complementary luminance according to the luminance of the luminance input signal. In the step S3, the statistical circuit 37 generates a statistical signal according to the luminance of the luminance input signal. Then, in the step S4, the calculating circuit 33 performs a predetermined function of the luminance input signal, the complementary luminance, and the statistical signal to generate a calculated luminance of the luminance input signal, and transmits the calculated luminance of the luminance input signal to the blending circuit 35. In the step S5, the blending circuit 35 generates a luminance output signal according to the luminance of the luminance input signal, the statistical signal, and the calculated luminance of the luminance input signal. Then, the video display device 20 displays images according to the luminance output signal.

The step S3 described above can be omitted. Then in the step S4, the calculating circuit 33 generates the calculated luminance of the luminance input signal according to the luminance of the luminance input signal and the complementary luminance. Likewise, in the step S5, the blending circuit 35 generates the luminance output signal according to the luminance of the luminance input signal and the calculated luminance of the luminance input signal. In addition, after the step S2, the shift unit 45 can be applied to adjust the complementary luminance according to the shift value. Besides, the edge-processing circuit 37 can be used to smooth the complementary luminance, too.

To sum up, the image adjustment apparatus 30 utilizes the complementary circuit 40 to generate a complementary luminance according to the luminance of the luminance input signal. Besides, the image adjustment apparatus 30 also utilizes the statistical circuit 37 to generate the statistical signal according to the luminance of the luminance input signal. Moreover, the image adjustment apparatus 30 also utilizes the calculating circuit 33 to generate the calculated luminance of the luminance input signal according to the luminance input signal, the complementary luminance and the statistical signal. In addition, the image adjustment apparatus 30 also utilizes the blending circuit 35 to generate the luminance output signal according to the luminance input signal and the calculated luminance of the luminance input signal. At last, the video display device 20 can display images according to the luminance output signal. Thereby, the luminance of images can be adjusted to provide better picture qualities for the video display device 20.

Accordingly, the present invention conforms to the legal requirements owing to its novelty, unobviousness, and utility. However, the foregoing description is only a preferred embodiment of the present invention, not used to limit the scope and range of the present invention. Those equivalent changes or modifications made according to the shape, structure, feature, or spirit described in the claims of the present invention are included in the appended claims of the present invention.

The invention claimed is:

1. An apparatus for adjusting a luminance of an image signal, comprising:

a complementary circuit to receive the image signal and generate a complementary luminance according to the luminance of the image signal;

a statistical circuit to receive the image signal and to generate a statistical signal according to the luminance of the image signal;

a calculating circuit coupled to the complementary circuit and the statistical circuit to generate a calculated luminance of the image signal according to the image signal, the complementary luminance, and the statistical signal; and a blending circuit coupled to the calculating circuit to blend the calculated luminance and the luminance of the image signal according to a blending factor and to generate an output image signal.

2. The apparatus of claim 1, wherein the complementary circuit further comprises a shift unit to receive the complementary luminance and adjust the complementary luminance according to a shift value.

3. The apparatus of claim 1, wherein the image signal is a luminance input signal of images.

4. The apparatus of claim 1, wherein the output image signal is a luminance output signal.

5. The apparatus of claim 1, further comprising:

an edge-processing circuit, coupled between the complementary circuit and the calculating circuit, for smoothing the complementary luminance.

6. The apparatus of claim 5, wherein the edge-processing circuit is a low-pass filter.

7. The apparatus of claim 1, wherein the blending circuit further couples to the statistical circuit for generating the output image signal according to the statistical signal.

8. The apparatus of claim 1, wherein the calculating circuit performs a predetermined function of the image signal, the complementary luminance, and the statistical signal to generate the calculated luminance of the image signal according to the image signal, the complementary luminance, and the statistical signal.

9. A method for adjusting a luminance of an image signal, the method comprising:

receiving the image signal;

generating, in a complimentary circuit, a complementary luminance according to the luminance of the image signal;

generating, in a statistical circuit, a statistical signal according to the luminance of the image signal;

generating, in a calculating circuit, a calculated luminance according to the luminance of the image signal, the complementary luminance, and the statistical signal; and blending, in a blending circuit, the calculated luminance and the luminance of the image signal and thereby generating an output image signal.

10. The method of claim 9, further comprising:

adjusting the complementary luminance according to a shift value.

11. The method of claim 9, wherein the image signal is a luminance input signal of images.

12. The method of claim 9, wherein the output image signal is a luminance output signal.

13. The method of claim 9, further comprising:

smoothing the complementary luminance.

14. The method of claim 13, wherein the step of smoothing the complementary luminance is implemented by low-pass filtering.

15. The method of claim 9, wherein the step of generating an output image signal further comprising:

generating the output image signal in accordance with the statistical signal.

16. The method of claim 9, wherein the step of blending the calculated luminance and the luminance of the image signal further comprising:

blending the calculated luminance and the luminance of the image signal according to a blending factor and thereby generating the output image signal.

17. The method of claim 9, wherein the step of generating the calculated luminance comprises:

performing a predetermined function of the luminance of the image signal, the complementary luminance, and the statistical signal to generate the calculated luminance.

* * * * *